United States Patent [19]
Ganesan et al.

[11] Patent Number: 5,727,160
[45] Date of Patent: Mar. 10, 1998

[54] RADIO PORT CONTROLLER IN A WIRELESS PERSONAL COMMUNICATION SYSTEM

[75] Inventors: Kalyan Ganesan, Germantown; Ranjan Pant; Robert Fischler, both of Gaithersburg; Kim Goh, Germantown; Barrie Saunders, Frederick; Tayyab Khan, Germantown, all of Md.

[73] Assignee: Hughes Electronics, Los Angeles, Calif.

[21] Appl. No.: 482,247

[22] Filed: Jun. 7, 1995

Related U.S. Application Data

[63] Continuation-in-part of Ser. No. 344,272, Nov. 23, 1994.
[51] Int. Cl.$^6$ .................... H04Q 7/24; H04L 12/00
[52] U.S. Cl. .............. 395/200.79; 370/364; 370/380; 379/93.09; 455/432; 395/311
[58] Field of Search ................. 395/200.2, 200.02, 395/200.06, 308, 311, 200.79; 379/58, 94, 93.09; 370/380, 364; 455/432

[56] References Cited

U.S. PATENT DOCUMENTS

| | | | |
|---|---|---|---|
| 4,829,554 | 5/1989 | Barnes et al. | 379/58 |
| 5,343,513 | 8/1994 | Kay et al. | 379/59 |
| 5,475,689 | 12/1995 | Kay et al. | 370/337 |
| 5,526,397 | 6/1996 | Lohman | 379/58 |

OTHER PUBLICATIONS

Harasty et al. "Architecture Alternatives for Wireless Data Servies", Universal Personal Communications, 1994 3rd Int'l Conference, 1994.

*Primary Examiner*—Dinh C. Dung
*Attorney, Agent, or Firm*—John Whelan; Wanda Denson-Low

[57] ABSTRACT

A preferred embodiment provides a radio port controller in a wireless personal communications system including a first interface module in communication with a radio port, a second interface in communication with a digital switch, and at least one switching transcoder module in communication with the first and second interface modules. A further preferred embodiment provides that the switching transcoder module includes a digital signal processor. The radio port controller preferably has a communication backplane including a plurality of slots, and each slot is preferably adapted to selectively receive either a T1 card interfacing to a T1 line or an E1 card interfacing to an E1 line.

19 Claims, 19 Drawing Sheets

FIG.6
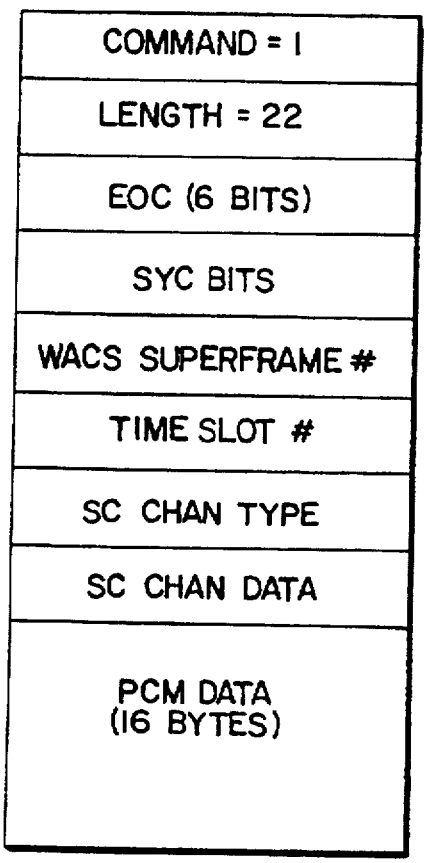
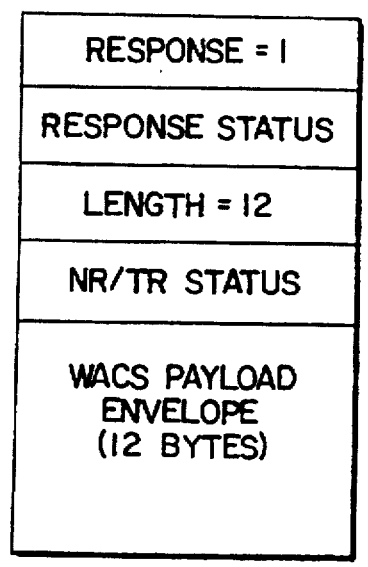

FIG. 9
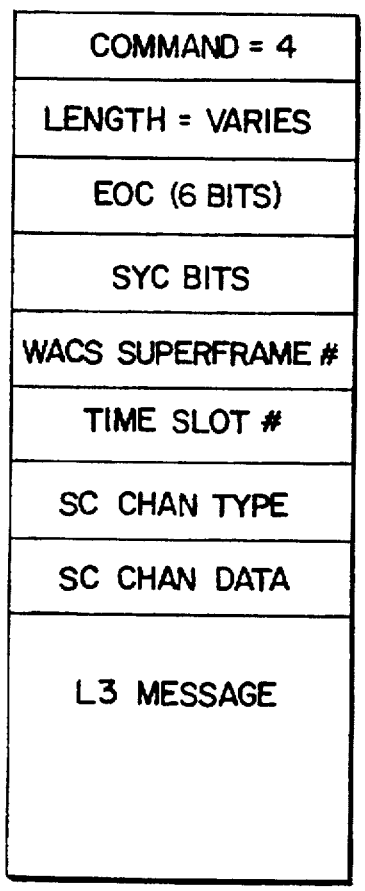
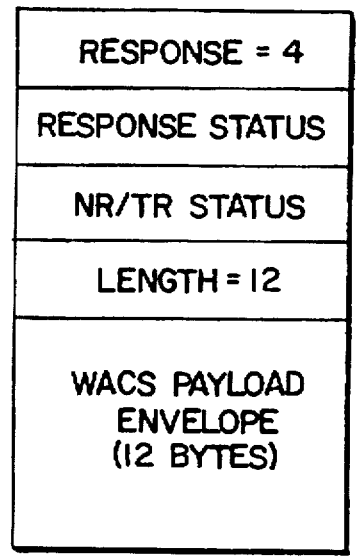

FIG. 10

| COMMAND = 5 |
|---|
| LENGTH = 7 |
| NR210 VALUE |
| NR211 VALUE |
| NR212 VALUE |
| NR213 VALUE |
| TR216 VALUE |
| TR217 VALUE |
| TR218 VALUE |

| RESPONSE = 5 |
|---|
| RESPONSE STATUS |
| NR/TR STATUS |
| LENGTH = 0 |

FIG. II

| COMMAND = 7 |
|---|
| LENGTH = 1 |
| TIME SLOT # |

| RESPONSE = 7 |
|---|
| RESPONSE STATUS |
| NR/TR STATUS |
| LENGTH = 12 |
| WACS PAYLOAD ENVELOPE (12 BYTES) |

FIG. 12

| TABLE A. DSP-WACS PAYLOAD ASSIGNMENT | | |
|---|---|---|
| DSP NUMBER | Tx WACS PAYLOAD NUMBER | Rx WACS PAYLOAD NUMBER |
| 1 | | 0a,4a |
| 2 | 0a,4a | |
| 3 | | 1a,5a |
| 4 | 1a,5a | |
| 5 | | 2a,6a |
| 6 | 2a,6a | |
| 7 | | 3a,7a |

| TABLE A. (CONT.) DSP-WACS PAYLOAD ASSIGNMENT TABLE | | |
|---|---|---|
| DSP NUMBER | Tx WACS PAYLOAD NUMBER | Rx WACS PAYLOAD NUMBER |
| 8 | 3a,7a | |
| 9 | | |
| 10 | | |
| 11 | | |
| 12 | | |

RADIO PORT CONTROLLER IN A WIRELESS PERSONAL COMMUNICATION SYSTEM

CROSS-REFERENCES TO RELATED APPLICATIONS

The present application is a continuation in part of application Ser. No. 08/344,272, (pending) filed Nov. 23, 1994, entitled "Wireless Personal Communication System," by inventors K. Ganesan, et. al. The above identified application in its entirety is incorporated herein by reference.

BACKGROUND OF THE INVENTION

Wireless access communications systems (WACS) strive to provide flexible wireless communication services. WACS, may provide a system for improving or eliminating drop wire requirements to homes and businesses. Although cellular telephones and cordless telephones also provide wireless features, certain limitations are inherent in each of these systems. Cellular telephones typically transmit signals to cellular base stations at relatively high power levels. The high power levels require Federal Communications Commission (FCC) approval and careful frequency planning to avoid unwanted interference. Additionally, the cellular base stations tend to be complicated and expensive units. Cordless telephones are lower power devices, but the transmission frequencies are usually prone to interference. Also, cordless phones require wire connections to the public telephone lines and cannot communicate with wireless access communication Personal Communication Services (PCS) systems. Furthermore, cellular phones and cordless phones are generally not capable of supporting both voice and data transmissions.

A typical architecture for a wireless PCS system includes subscriber units (SUs), radio ports (RPs), one or more radio port controllers (RPCs), sometimes referred to as radio port control units (RPCUs) in other publications, and an access manager (AM). The SUs transmit information to the RPs using radio frequencies. RPs are usually small devices that are typically mounted to a utility pole. The RPs are connected to an RPC using wireline facilities. Each RPC is connected to a switch that is part of the public switched telephone network (PSTN) and the AM. The AM provides overall coordination of the call handoff across RPCs, has the function of mobility management, and supports subscriber related features such as registration and authentication.

A consortium of telecommunication entities has recently developed a proposed standard for providing WACS PCS. This standard outlines the above-mentioned architecture. Further details concerning this proposed standard are set out in Bellcore Corp. publication TR-INS-001313 entitled Generic Criteria for Version 0.1 Wireless Access Communications Systems (WACS) published October 1993 (hereinafter "Generic Criteria"). The publication is available to those interested in WACS PCS from Bellcore Corp. at Bellcore, Customer Services, 8 Corporate Place - Room 3C-183, Piscataway, N.J. 08854-4156, or at 1 (800) 521-CORP. Also, the reader may refer to Bellcore manual SR-ARH-002315 that describes specific modulator and demodulator requirements in the SU and the RP. Additionally, the U.S. Telecommunications Industry Association (TIA) has recently approved a PACS standard as set forth in TIA publication JTC(AIR)/95.4.20-033R2. The reader is presumed to be familiar with these specifications and with related technological issues known to those having ordinary skill in the art.

Although general standards have been set forth, advances and improvements to the technology have been discovered including implementation of novel configurations and circuitry. The preferred embodiment is primarily directed toward improvements relating to the RPC.

SUMMARY OF THE INVENTION

The preferred embodiment of the present invention relates to a radio port controller in a wireless personal communications system including a first interface module in communication with a radio port, a second interface module in communication with a digital switch, and at least one switching transcoder module (STM) in communication with the first and second interface modules. The STM preferably includes at least one digital signal processor (DSP) having an interrupt of less than 1 millisecond. The first interface module preferably includes a T1 card that is coupled to a T1 communication line. The second interface module preferably includes an E1 card coupled to the digital switch.

The RPC preferably has a communication backplane including a plurality of slots. Each slot is preferably adapted to selectively receive either a T1 card interfacing to a T1 line or an E1 card interfacing to an E1 line.

Each STM is preferably connected to a separate T1 line. Each STM preferably has at least one DSP capable of processing both digitized voice and personal communication system messages. In one preferred embodiment, the STM includes at least one DSP handling both incoming and outgoing message traffic. The DSP may handle from two to four different conversations at the same time.

In another preferred embodiment, the STM has a first digital signal processor assigned to process incoming voice and data messages and a second digital signal processor assigned to process outgoing voice and data messages. The STM may further include a plurality of memory buffers in communication with the DSPs. The buffers may be circular buffers adapted to receive and transmit personal communication system messages from an RP or from a digital switch. Each STM may further include a central processor for allocating each time slot in each T1 communication line to at least one of the DSPs. The central processor preferably communicates with each DSP using inter-processor data messages.

The RPC preferably includes a call control processor including state machines for processing ISDN layers one, two, and three and WACS layer three protocols. In one embodiment, the RPC includes at least one global resource processor for balancing loading among various other call control processors in the RPC. The RPC may further include a disk drive coupled to the global resource processor. The global resource processor may cooperate with the disk drive to perform at least some access manager functions.

The RPC also preferably includes a channel access processor (CAP) for processing layer 2 personal communication system messages. Each of the processors within the RPC may execute a multi-tasking operating system. The multi-tasking operating system allows processors to create a thread that is associated with a routine executed by the processor. In one embodiment, a thread is created by the operating system for at least one routine performing call processing functions.

The invention itself, together with further attendant advantages, will best be understood by reference to the following detailed description, taken in conjunction with the accompanying drawings.

BRIEF DESCRIPTION OF THE DRAWINGS

FIGS. 6–11 are diagrams various internal of communication messages which may be used within the STM of FIG. 4.

FIG. 12 is a preferred DSP assignment table in the central processor of FIG. 5.

DETAILED DESCRIPTION OF THE PREFERRED EMBODIMENTS

Figure 1:
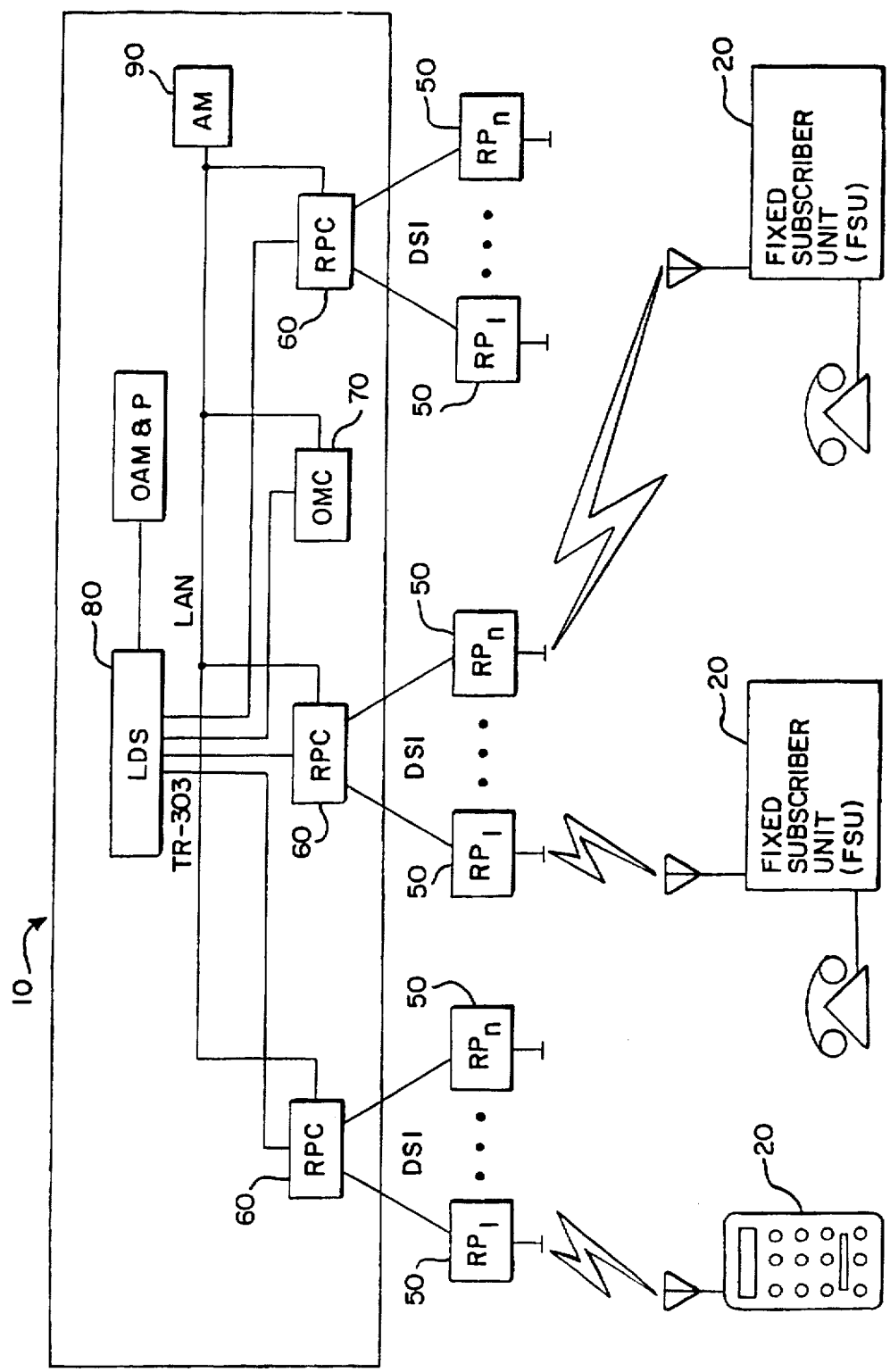
FIG. 1 is a block diagram of a wireless access communication system.

FIG. 1 illustrates a general block diagram of a wireless access communication system (WACS) 10. The WACS 10 includes subscriber units (SU) 20, radio ports (RP) 50, radio port control units (RPC) 60, an operations maintenance center (OMC) 70, a local digital switch (LDS) 80, and an access manager (AM) 90. The SU 20 communicates with the radio port 50 via an air interface. Each RP 50 communicates with an RPC 60 via transmission lines, typically standard T1/DS1 lines. The RPC 60 controls radio links via the RP 50, while transmission lines carry various voice and data communications. The switch 80 controls access between communications. The switch 80 controls access between wireless access communication systems (WACS) 10 and the public switch telephone network (PSTN) 12. The AM 90 provides call control and also communicates with the switch 80 providing voice paths between the WACS network and the PSTN. Additional details are known to those skilled in the art and are set forth in the Bellcore "Generic Criteria". Recently, a newer proposed standard, personal access communications (PACS), has been introduced. Both WACS and PACS standards, however, may be implemented on the system described below.

Figure 2:
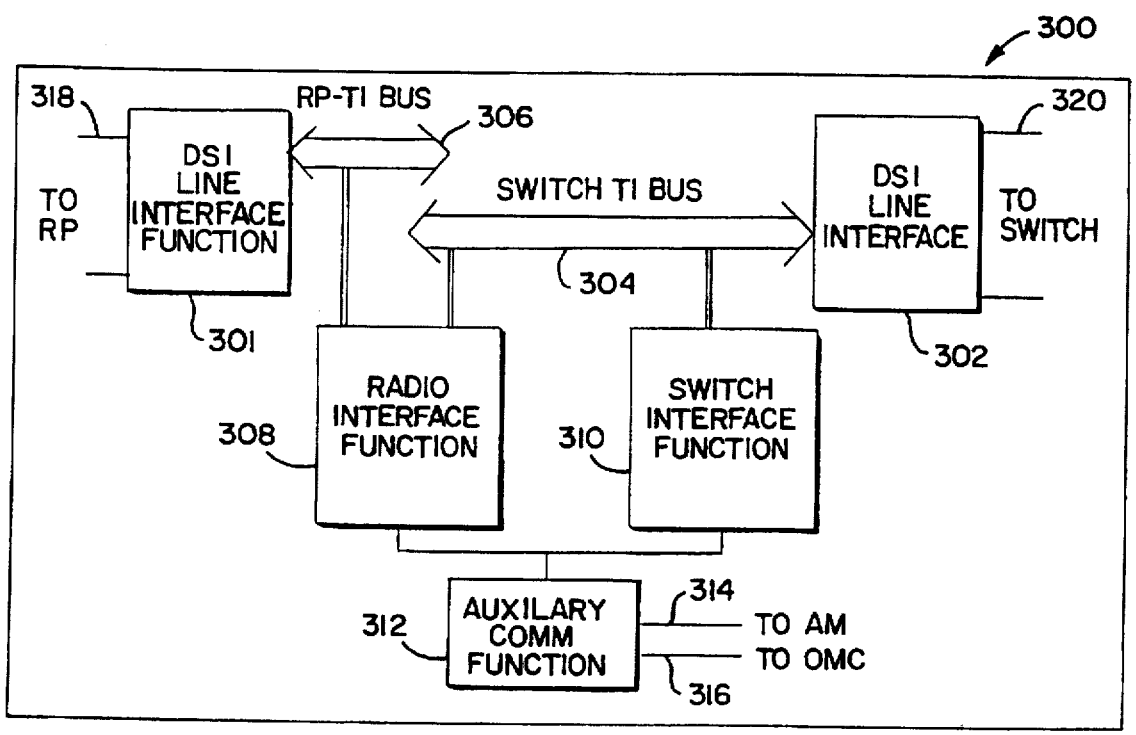
FIG. 2 is a block diagram showing functions to be performed by an RPC.

A central component in the wireless personal communication system is an improved radio port controller (RPC) 300 as shown in FIG. 2 of the preferred embodiment. The RPC 300 manages RP 50 resources and controls the transport of information between a network switch 80 and its associated RPs 50.

The RPC 300 interfaces with at least one RP 50 and with at least one switch 80. The RP 50 interface is preferably a DS1 layer 1 unchannelized interface allowing a 1.544 Mb/s clear channel and a TDM/TDMA layer 2 interface mapping the TDM/TDMA time slots to the DS1 channel. The RPC 300 to switch 80 interface is preferably a DS1 physical interface using the multiplexed ISDN Basic Rate Interface BRI communication protocol defined in the Bellcore specification.

In the basic configuration contemplated by the Bellcore specification, the RPC 300 performs call processing functions and transcodes compressed data into full PCM data and vice-versa. The RPC 300 exchanges signaling information with the SU 20 and collects performance monitoring information (e.g. radio link quality, channel usage, channel allocation, traffic data, and system capacity information).

The RPC 300 further includes an RP DS1 line interface 301 connected to RPs 50 over RP DS1 communication links 318 and a switch DS1 line interface 302 connected to the switch 80 over switch DS1 communication links 320. The RPC 300 also includes a first interface module performing radio interface functions 308 in communication with the RP DS1 line interface 301 through an RP-T1 bus 306 and a second interface module performing switch interface functions 310 in communication with the switch DS1 line interface 302 through a switch T1 bus 304. The radio interface 308 and the switch interface 310 are connected to an auxiliary communication function 312. The auxiliary communication functions 312 preferably interface with the AM 90 over a first Ethernet TCP/IP interface 314 and is connected to the OMC 70, preferably over a second Ethernet TCP/IP interface 316.

The RP-DS1 line interface functions 301 preferably consist of the physical, mechanical, and electrical functions required to support the 1.544 Mb/s DS1 lines 318 to the RPs 50. The switch-DS1 line interface functions 302 preferably consist of the physical, mechanical, and electrical functions required to support the 1.544 Mb/s DS1 lines 320 to the switch 80.

The radio interface functions 308 include multiplexing and demultiplexing wireless personal communication system (WACS or PACS) traffic and signaling information into the unchannelized DS1 interface to the RP 318. The radio interface 308 also inserts unused bits in the RP DS1 interface 318 due to timing differences between the 1.544 Mb/s DS1 line and the RP 50 time slots. In addition, the radio interface functions 308 generate a TDM/TDMA synchronization pattern for the RP DS1 interface 318. The radio interface 308 also transcodes compressed digitized speech into mu-law PCM speech and transcodes mu-law PCM speech into compressed digitized speech. Currently, the RPC 300 compresses speech using 32 kb/s ADPCM encoding; however, other compression schemes may be used such as but not limited to 16 kb/s LDCELP or ADPCM type compression. Also, although mu-law PCM is used for uncompressed speech, other digital representations of speech may be used such as A-law PCM.

The radio interface functions 308 include error checking of wireless personal communication system layer 2 information preferably using a 16-bit checksum, and processing radio link quality measurements such as word error indication bits and co-channel interference codes received from the RP 50 over the RP DS1 interface 318. The radio interface 308 also processes layer 2 wireless personal communication system signaling messages. In addition, the radio interface 308 maintains TDM/TDMA timeslot status information such as busy/idle and per-call information for each active call. Finally, the radio interface 308 multiplexes alerting channel and system information channel information based on priority onto a system broadcast channel that is sent over the RP DS1 communication link 318.

The switch interface functions 310 include signaling functions required to interface to the switch. More specifically, the switch interface 310 receives and transmits call processing messages to the switch. In a preferred embodiment the communication protocol to the switch over the DS1 interface 320 consists of up to eight ISDN basic rate interfaces (BRI) and the switch interface 310 receives, transmits, and processes ISDN communication messages.

However, the interface 320 may be any other digital communication method such as ISDN primary rate interface (PRI) or an optical interface such as SONET. The switch interface functions 310 also interface with the auxiliary communication functions 312 such as incoming call processing and OMC functions. The switch interface functions 310 communicate with the radio interface functions 308 using the switch T1 bus 304 when processing outgoing calls.

The auxiliary communication functions 312 coordinate activities of various RPs 50 such as by maintaining per-RP information including e.g. "up/down" status, radio link quality, channel usage data, and traffic statistics. The auxiliary communication functions 312 route calls from the switch 80 to the proper RP 50. The auxiliary functions 312 also include sending, receiving, and processing layer 3 wireless personal communication messages to and from the AM 90 using the first Ethernet TCP/IP interface 314. The auxiliary functions 312 interface to the OMC 70 over the second Ethernet interface 316 to monitor and control a software downline load function such as when a new version of software may be downloaded to a component of the system. Such downloading is particularly useful for updating software in the SU 20.

Figure 3:
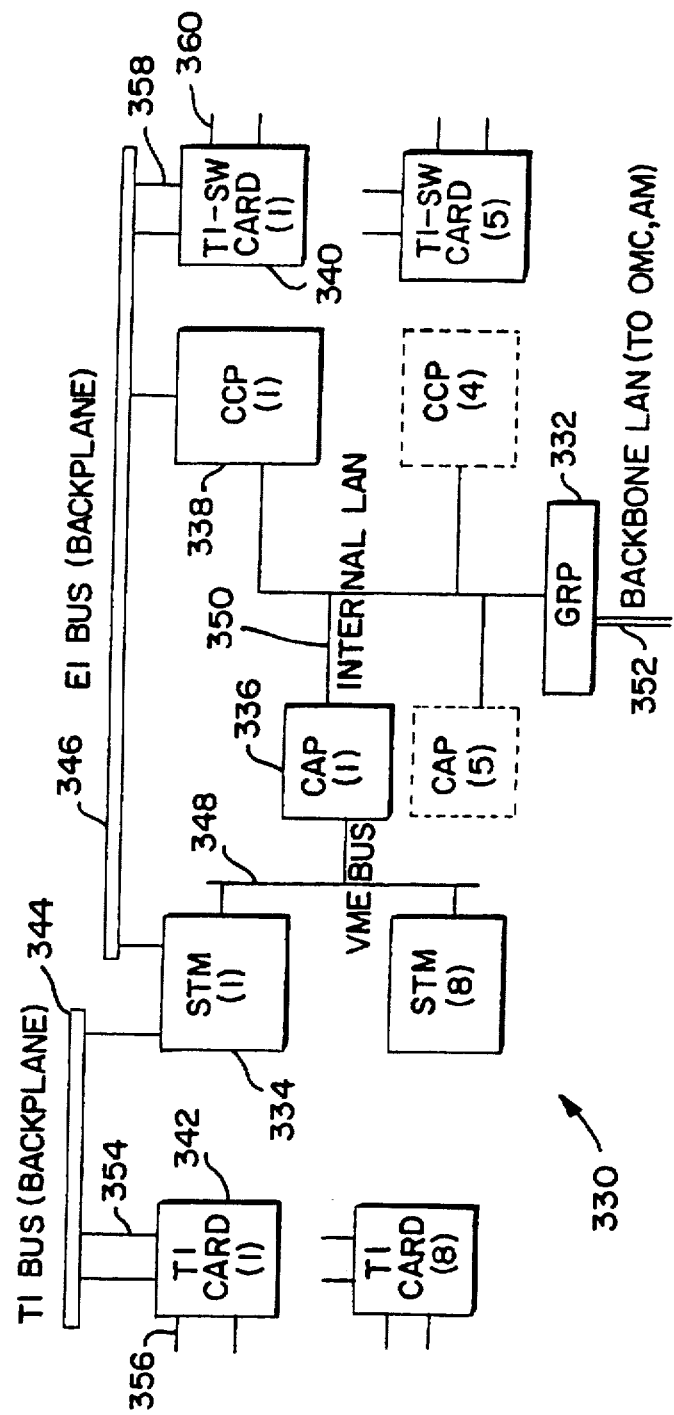
FIG. 3 is a block diagram illustrating one preferred embodiment of an RPC.

FIG. 3 shows a component block diagram of a preferred embodiment of an RPC 330. The RPC 330 includes a global resource processor (GRP) 332, a switching transcoder module (STM) 334, a common access processor (CAP) 336, and a call control processor (CCP) 338.

The GRP 332 communicates over a backbone LAN 352 to the OMC 70 and to the AM 90. The GRP 332 also communicates with at least one CAP 336 and at least one CCP 338 over an internal LAN 350. The GRP 332 provides access to the external backbone LAN 352 and performs network management and other centralized RPC 330 functions. Each CAP 336 preferably communicates with up to eight STMs 334 over a high speed VME bus 348. Each STM 334 is connected to both the T1 bus 344 and the E1 bus 346. Also, each CCP 338 is connected to the E1 bus 346.

As shown in FIG. 3, the RPC 330 preferably includes up to five CAPs 336, and four CCPs 338. Although FIG. 3 shows a specific number of each component, the preferred embodiment may include additional components. Specifically, the preferred embodiment may support additional components such as extra GRPs 332, CCPs 338, CAPs 336 and STMs 334.

The RPC 330 also includes a T1 bus 344 and an E1 bus 346. The T1 bus 344 interfaces to a plurality of RP T1 cards 342. Each T1 card 342 can support up to two T1 lines 356, each interfacing with an RP 50. The T1 card 342 communicates with the T1 bus 344 over a T1 bus slot connector 354. Similarly, a T1 switch card 340 may communicate with the switch over two T1 lines 360. The T1 switch card 340 is coupled to an E1 bus slot connector 358 connected to the E1 bus 346. The RP T1 card 342 may be installed in slots 1, 3, 5, 7 of a backplane (not shown) providing up to 8 T1 lines to the RPs 50. The switch side T1 cards 340 may be installed preferably in slots 9, 10, 11, 12, 13 of the backplane providing up to 10 T1 lines 360 to the switch.

In addition, as more processors are added, additional T1 cards 342 and T1 switch cards 340 may also be added. Also, it should be noted that the E1 bus 346 may also support E1 cards as well as T1 cards 349 for use in countries other than the United States such as in Europe. In a preferred embodiment, the backplane associated with the E1 bus 346 has a plurality of slots and each slot is associated with a connector adapted to receive an interface card 340 such as either a T1 or an E1 card. The T1 cards 340 preferably include a first set of pin outs for carrying a T1 signal for use with a T1 bus and a second set of pin outs for carrying an E1 signal for use with the E1 bus. The connector, preferably a single universal connector, electrically connects the E1 bus 346 to the interface card 340 (T1 or E1). Preferably, the E1 bus derives a 2 Mb/s clock signal from at least one of the T1 cards by speeding up the 1.544 Mb/s clock corresponding to the T1 line connected to the switch. The E1 bus therefore may carry up to 32 DS0 time slots although only 24 of these time slots are used by a T1 card.

In one embodiment, the type of card, T1 or E1, supported by each slot may be configured in software. Other techniques for sensing the nature of an inserted card (T1 or E1) and appropriately configuring the bus connections may similarly be used.

Each STM 334 receives and transmits wireless personal communication system interface frames to and from an RP 50 via one T1 line 356 and the T1 backplane bus 344. Preferably, one STM 334 is used to handle either one or two T1 lines 356 to the RP 50. Each STM 334 also receives and transmits speech data to and from the switch on DS0 slots on any of the T1 lines 360 connected to the E1 backplane bus 346.

The CAP 336 provides interrupt timing to the STMs 334 and sends commands to the STMs 334 over the VME bus 348. The VME bus 348 allows the CAP 336 to directly access, read or write the local memory within each STM 334. The CAP 336 can also access the backplane T1 bus 344. The CAP 336 communicates with the CCP 338 and the GRP 352 over the internal LAN 350.

The CAP 336 includes a common processor module (CPM) containing a processor such as an INTEL 960 processor including associated circuitry and a communication chip interface such as the AT&T SPYDER chip. The common processor communicates with either the T1 bus 344, the E1 bus 346, the LAN 359, or the VME bus 348.

Each CAP 336 manages and supports maintenance of radio links for up to 8 STMs 334. Each CAP 336 maintains information such as STM numbers, radio port IDs, RF carriers and TDM/TDMA time slots used by the radio link as well as the radio link status. Each CAP 336 generates STM 334 synchronization interrupts and forwards wireless personal communication system layer 3 messages received from the STM 334 to the CCP 338 and sends messages from the CCP 338 to the STM 334. The CAP 336 also processes wireless personal communication system layer 2 messages except the acknowledge mode transfer messages that are handled by the STM 334.

The CCP 338 provides an ISDN interface to the switch. The CCP 338 performs switch interface processing including ISDN D-channel signal processing and multiplexing/demultiplexing of multiple D channels from the switch side T1 line 360. The CCP 338 accesses time slots on the backplane E1 bus 346 containing ISDN channel signaling information received from the switch via a communication module, such as an AT&T SPYDER chip. The CCP 338 also performs wireless personal communication system layer 3 processing including call origination, call delivery, call disconnect and anchor ALT processing as well as the exchange of messages with the CAP 336 and the GRP 332 in support of layer 3 processing.

The GRP 332 provides RPC 330 centralized functions such as network management, OMC interfacing, set up and management of TCP/IP connections to the access manager AM, wireless access communication system layer 3 registration message processing, and load balancing between multiple CCPs 338 and CAPs 336.

Figure 4:
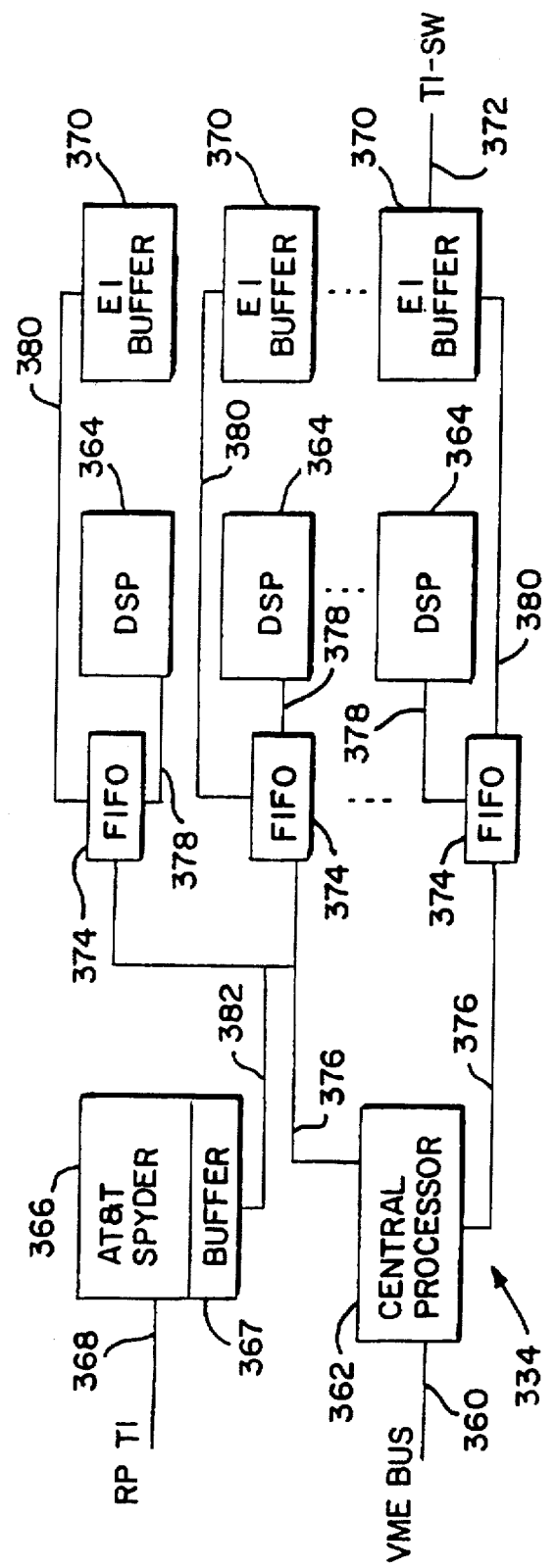
FIG. 4 is a block diagram of one preferred embodiment of an STM that may be used within the RPC of FIG. 3.

As shown in FIG. 4, the STM 334 contains one central processor (CP) 362 such as an INTEL 960 processor and 12 digital signal processors (DSP)s 364 such as Texas Instruments TMS320C30DSP processors in the preferred embodiment. The STM 334 also has an E1 buffer 370 for communicating with the switch 80, and a T1 communication processor 366, such as an AT&T SPYDER processor, for communicating with the RPs 50.

The E1 buffer 370 includes an input buffer having the same length, preferably 320 bytes, as an output buffer. The E1 buffer 370 contains a forward slot location pointer (FSLP) for determining the current position in the E1 buffer 370 for transmitting and receiving data. The FSLP may be a register containing the offset into the buffer 370 of the current byte being received or transmitted.

The T1 communication processor 366 is preferably configured so that a DS1 frame is divided into two superchannels. Each superchannel carries 12 bytes of a wireless personal communication system payload group. A payload group consists of 1680 bits (16 bursts, each burst having 105 bits) of data from the RP 50. According to an aspect of the present invention, a circular buffer 367 having a buffer size that matches the size of the RP time slot is provided. Preferably, the number of buffers matches the size of the payload group. Such a configuration allows efficient synchronization to the payload group in addition to efficient manipulation of RP 50 time slot data. Preferably, the buffer 367 consists of 16 circularly linked blocks having 12 bytes each. A suitable buffer 367 may be configured within a communication interface such as a SPYDER interface module.

The DSPs 364 provide speech transcoding such as ADPCM to PCM or LDCELP to PCM, as well as wireless personal communication system layer 2 message processing. The DSPs 364 also perform error checking and discard erroneous data received from the SU 20 in order to provide a more robust air interface. The DSPs 364 communicate with the CP 362 via an internal FIFO 378 mechanism. The CP 362 communicates with the CAP module 336 via the backplane VME bus 348 and also communicates via the internal LAN 350 during downloading and debugging.

A pair of DSPs 364 within each STM 334, one DSP 364 for processing receive slots from the RP side and the other DSP 364 for processing receive slots from the switch side T1 360. The CP 362 assigns each of the DSPs 364 into pairs where one DSP 364 is a Rx DSP 364 and the other is a Tx DSP 364. Each DSP 364 pair converts ADPCM speech from the RP side T1 line 356 to PCM speech sent to the switch side T1 line 360, as well as compresses PCM speech from the switch to ADPCM speech sent to the RP 50.

The pair of DSPs 364 also perform wireless personal communication system layer 2 acknowledge mode transfer processing. This processing involves splitting and recombining layer three messages into multiple layer two segments; maintaining sequence number, checksum, and acknowledgment data; and retransmitting layer two messages. The layer three messages are used for call setup, tear down, and automatic link transfer (ALT) requests. By using layer three message for ALT requests, the RPC 330 provides a more robust call handoff. In addition, acknowledge mode transfer processing may be used to transport simple pack mode or circuit mode data. The pair of DSPs 364 also perform RP signal quality measurements such as received signal strength indicator (RSSI) measurements. The pair of DSPs 364 processes the RSSI values received from the RP 50 and provides measurement information based on the RSSI values to the CP 362.

The DSP 364 periodically measures and averages a word error indicator (WEI) from the RP 50 to detect when the SU 20 has powered off or traveled outside the range of the RP 50. In this case, the DSP 364 informs the CCP 338 to disconnect any call in progress over that SU 20.

The CP 362 receives wireless personal communication system messages from the RP 50 and distributes data to the pair of DSPs 364. The CP 362 also receives PCM speech from the switch and distributes the data to the pair of DSPs 364 handling the call. The CP 362 synchronizes wireless personal communication system messages on the RP side and performs wireless personal communication system layer 2 and layer 3 message forwarding between the CAP 336 and the pair of DSPs 364. The CP 362 also marks the next available slot for a call to the RP 50 using RSSI information received from the DSPs 364 or using a round-robin scheme in some cases. Finally, the CP 362 processes anchor time slot interchange information.

Figure 5:
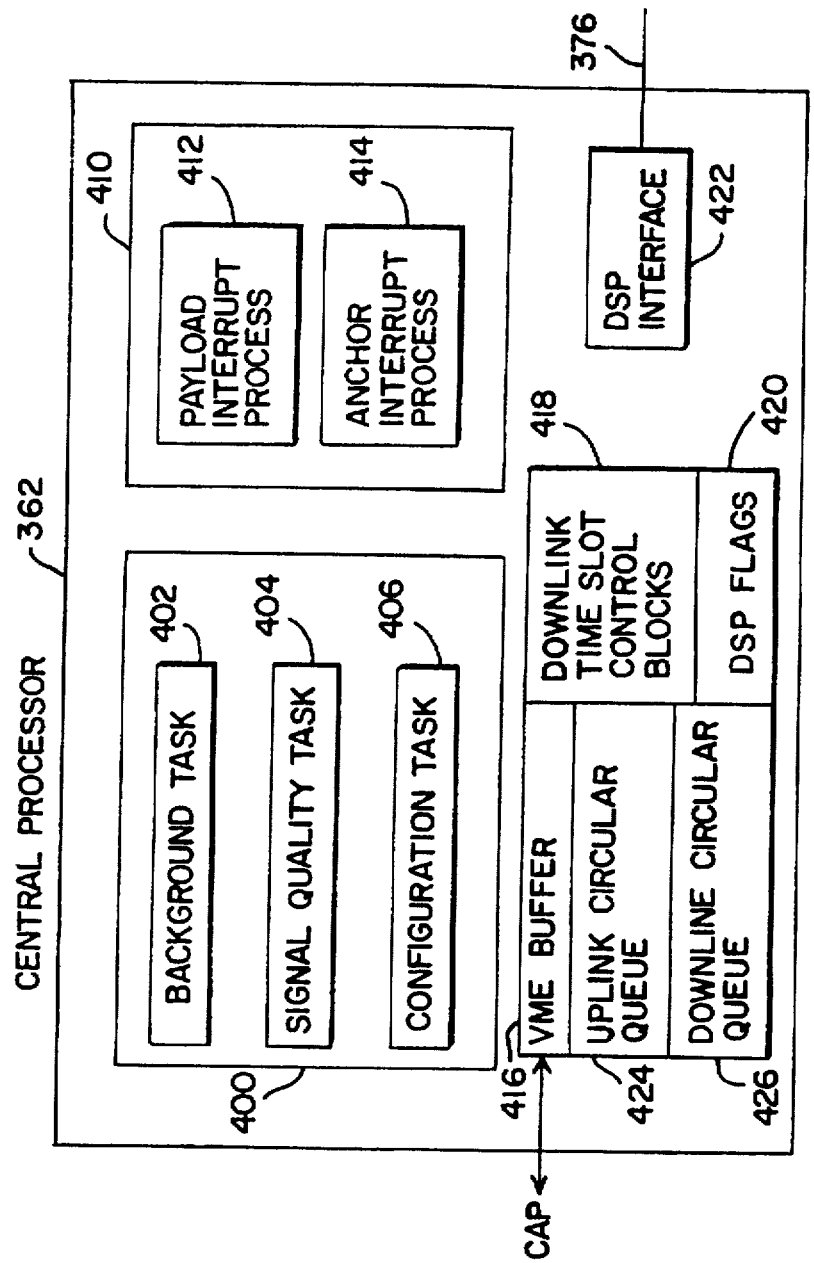
FIG. 5 is a functional block diagram of a central processor that may be used in an STM within an RPC.

As shown in FIG. 5, the CP 362 in the STM 334 preferably contains a background process 400, an interrupt process 410, a DSP interface 422, and various memory components. The memory components include data structures such as the VME buffer 416, the time slot control blocks 418, the uplink circular queue 424, the downlink circular queue 426, and the DSP flags 420. The VME buffer 416 is connected to the VME BUS 348 and allows communication between the STM 334 and the CAP 336. The time slot control blocks 418 preferably include 16 blocks grouped into an array with one block for each RP T1 368 time slot. The time slot control blocks 418 contain all the information required by a payload interrupt process 412 to process voice and layer 2 messages related to each time slot in the RP T1 line 368. The DSP flags 420 include an array of state flags, one for each DSP 364. In the preferred embodiment there are 12 DSPs so the array contains 12 DSP flag entries. Each flag entry is used to mark whether a DSP 364 is available for use by the payload interrupt process 412.

The interrupt process 410 performs all time critical processing including building a wireless personal communication system payload envelope and determining which time slot to mark as available. The background process 400 performs non-time-critical functions required by the STM 334.

In a preferred embodiment, the background process 400 consists of the background task 402, the signal quality task 404, and the configuration task 406. The background task 402 preferably performs the following functions: sending health check messages to the controlling CAP 336, checking the health of the DSPs 364 and reloading DSPs 364 reporting a large number of errors, monitoring and, if necessary, resetting the E1 hardware such as the E1 bus 346, processing commands received from the CAP 336, and monitoring STM 334 alarm conditions. STM 334 alarm conditions may include loss of T1 clock, loss of or unstable CAP 336 interrupt, STM 334 to CAP 336 interface failure, DSP 364 failure, loss of synchronization at the RP T1 368, and E1 buffer 370 memory failure.

The signal quality task 404 periodically processes RP 50 signal quality measurement data such as RSSI data received from the DSP 364 and uses the signal quality data to mark the next best time slot available in the time slot control block 418. Preferably, the configuration task 406 is responsible for processing STM 334 configuration messages received from the CAP 336 during STM 334 initialization and reconfiguration. A more detailed description of hardware initialization and configuration may be found in U.S. Pat. No. 5,299,198, the entire disclosure to be incorporated by reference herein.

The interrupt process 410 includes the wireless personal communication system payload interrupt process 412 and an anchor interrupt process 414. The payload interrupt process 412 is controlled by a control interrupt, preferably 500 micro seconds in duration, generated by the CAP 336.

In a preferred embodiment, the payload interrupt process 412 periodically performs the following functions: voice processing, next available slot marking, wireless personal communication system layer 2 and 3 processing, and setting the time slot control block 418 active upon receipt of a busy time slot indication. Voice processing involves moving data from the E1 input buffer 370 to the DSP 364 for compression, such as ADPCM compression, and then moving the compressed data to the transmit buffer 367 for output to the RP T1 line 368. Voice processing also includes receiving voice data from the receive buffer 367 and decompressing the data to PCM data and placing the PCM data into the E1 output buffer 370.

Layer 2 and 3 message processing involves processing both uplink and downlink messages. For the uplink, a message received from the SU 20 via the RP 50 is inserted into the uplink time slot circular queue 424. For the downlink, a message from the CAP 336 is inserted into the downlink time slot circular queue 426 indicating the message is available for transmission over the RP T1 line 368.

Preferably, the anchor interrupt process 414 is enabled when the STM 334 is configured for anchor mode. The anchor interrupt routine 414 preferably moves data from the E1 input buffer 370 for a particular DS0 slot of the T1 line 372 to the E1 output buffer 370, effectively looping data from the switch.

The DSP interface module 422 may communicate with the DSPs 364 using the FIFO 374. The DSP interface 422 may send and receives formatted messages to the DSPs 364 over a FIFO data bus 376 by reading and writing data. When a command is sent to the DSP 364 it may also be written into the FIFO 374. The CP 362 then issues an interrupt to the DSP 364, and the DSP 364 preferably processes the command and inserts a response back into the bidirectional FIFO 374. Each response from the DSP 364 contains a response status code. In a preferred embodiment the following response status codes are available: no error (0x00), PCM data returned (0x01), wireless personal communication system payload returned (0x02), layer 2 message returned (0x03), layer 3 message returned (0x04), INFO_ACK being processed (0x05), layer 3 message segment in response (0x06), layer 3 message acknowledged (0x07), error (0xff). Each response from the DSP 364 also contains a NR/TR status field containing the status of DSP 364 timer (TRxxx) and counter (NRxxx) parameters. The NR/TR status field is bit mapped with each bit set to 1 if the NRxxx counter value has been exceeded or the TRxxx timer has expired. In the preferred embodiment the NR/TR status field includes: bit 0—TR216 timer; bit 1—TR217 timer; bit 2—TR218 timer; bit 3—NR210 count; bit 4—NR211 count; bit 5—NR212 count; and bit 6—NR213 count.

Each CP 362 to DSP 364 command or response includes a time slot number corresponding to the RP T1 368 payload group being processed. In the preferred WACS embodiment, the CP 362 allocates time slots 0 to 15 in the payload groups A and B to the various DSPs 364 based on the number of calls supported by the system. The CP 362 may either statically allocate the time slots or may dynamically allocate the time slots to balance loading among multiple DSPs 364.

Some of the CP 362 to DSP 364 commands or responses includes an SC type field and an SC data field that is dependent on the SC type field. Preferably, the SC type fields include the following types: system broadcast (0x00)—the SC data field contains the available bandwidth; available channel (0x01)—the SC data field contains the available bandwidth; busy channel with CCIC (0x02)—the SC data field contains the CCIC; busy channel with MC-S (0x03)—SC data field contains the 4 bit segment of the MC-S; and busy channel with SDC (0x04)—SC data field contains 4 bit directive of the SDC.

In a preferred embodiment, the following CP 362 commands and DSP 364 responses may be supported: ADPCM compression, payload processing, layer 2 message building, layer 3 message building, DSP configuration, link deactivation, and layer 3 polling. As shown in FIG. 6, the ADPCM compress command has octet aligned fields containing 16 bytes of PCM voice data. The ADPCM command also includes a length field containing the number of following bytes in the command, an embedded operations channel EOC field, SYC bits, a wireless personal communication system superframe number, the time slot number, the SC channel type, and the SC channel data. The ADPCM response contains a 12 byte payload envelope built by the DSP 364 as well as the response status field, the length field, and the NR/TR status field.

Figure 7:
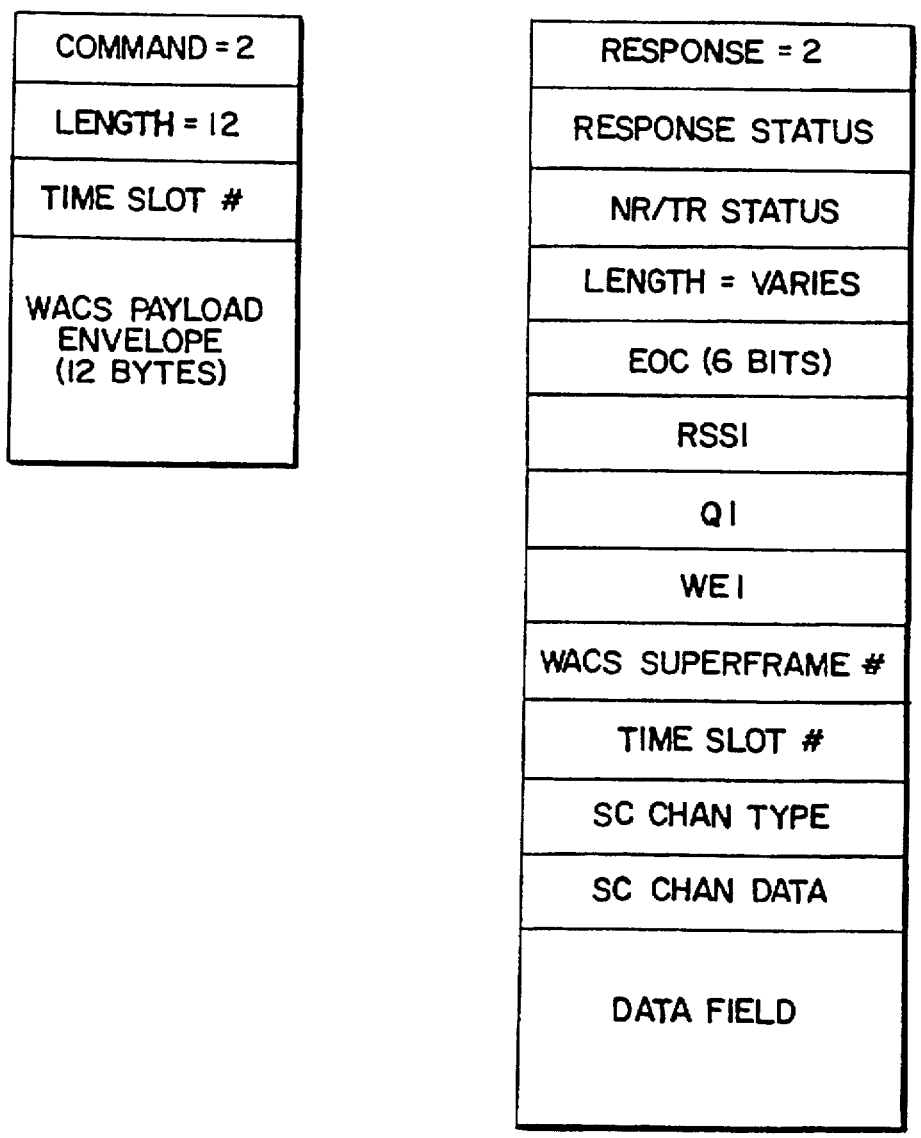

As shown in FIG. 7, the process payload command preferably contains the payload envelope to be processed. The response contains a data field that may be PCM data, a layer 2 message, a layer 3 message, or may be empty if a layer 3 message is pending. The response also includes the EOC, the signal quality RSSI value, the quality indicator (QI), the word error index (WEI), the wireless superframe number, the time slot, and the SC channel type and data.

Figure 8:
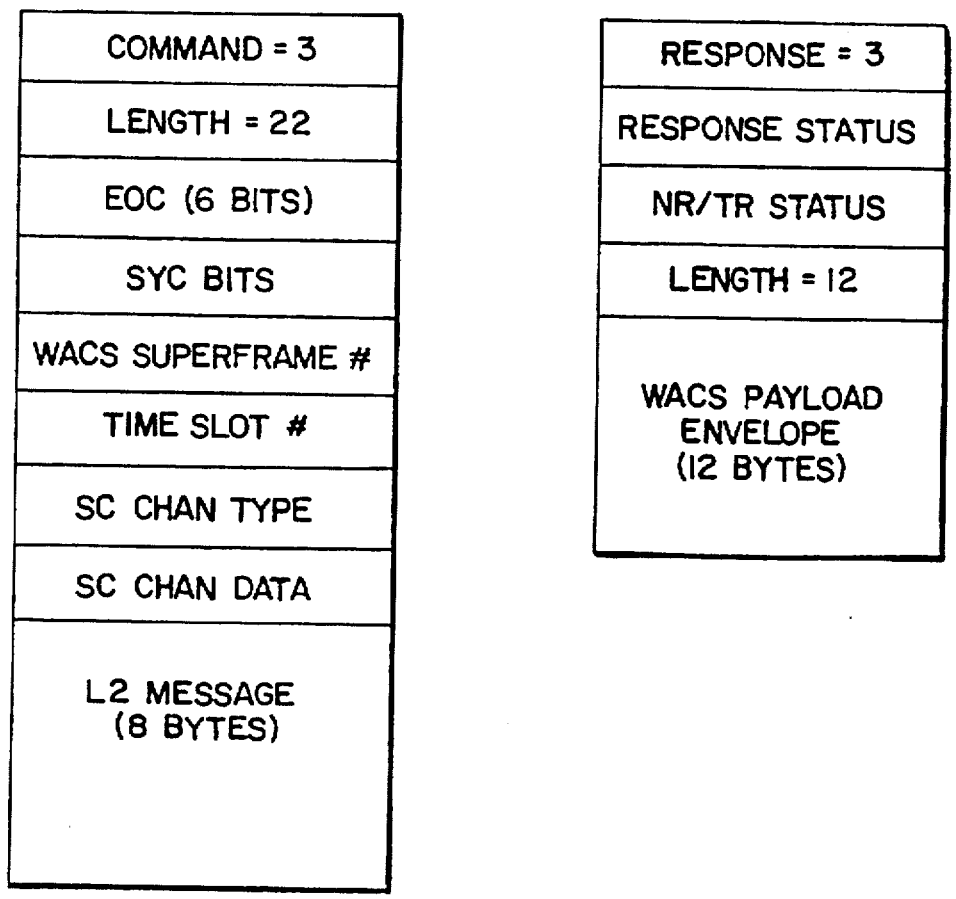

As shown in FIG. 8, the build layer 2 message command preferably contains a layer 2 message. The response includes the payload envelope containing the layer 2 message.

As shown in FIG. 9, the build layer 3 message command preferably includes a layer 3 message to be built into multiple payloads. The command may include a payload containing a portion of the layer 3 message. Subsequent commands sent to the DSP 364 result in a response including payloads containing further segments of the layer 3 message and a status of layer 3 message pending until the entire layer 3 message has been sent to the RP 50.

As shown in FIG. 10, the configure DSP command preferably loads the NRxxx and TRxxx parameters into the DSP 364.

The deactivate link command (not shown) causes the DSP 364 to stop any protocol processing and to reset its sequence numbers for the given time slot.

As shown in FIG. 11, a layer 3 polling command may poll the DSP 364 for a layer 3 acknowledgement message originated by the SU 20. When the CP 362 sends a layer 3 message to the DSP 364, the CP 362 preferably polls the DSP 364 until receiving a response having a response status of "layer 3 message received" indicating that the SU 20 has acknowledged receiving the layer 3 message. When the response indicates that the SU 20 has acknowledged receiving the layer 3 message, the length field in the response is zero and the response does not contain a payload envelope.

FIG. 12 shows how DSPs 364 may be allocated by the CP 362 for processing the individual payload envelopes in a payload group. The letter "a" is the first RF frequency in the payload group. As shown, the DSPs 364 are grouped into pairs, one transmitting DSP and one receiving DSP. The DSPs 364 are grouped into pairs so that signalling for ACK_MODE_TRANS and INFO_ACK message processing can occur using a dual port shared RAM between the pair of DSPs 364. Although FIG. 12 only shows allocation of DSPs 364 for a single RF frequency, other allocations of DSPs 364 are possible for handling multiple RF frequencies.

According to another aspect of the present invention, the STM 334 operates in the following manner. For downlink voice processing, the STM 334 moves voice data from the switch 80 to the SU 20 via the RP 50. STM 334 downlink voice processing is initiated by the payload interrupt process 382. After 16 bytes of data has been received into the E1 buffer area 370, the CP 362 composes the 16 bytes of voice data into a compression command sent to a transmit (Tx) DSP 364. The Tx DSP 364 converts the 16 bytes of PCM voice data into ADPCM data and forms a payload envelope containing the compressed data. The payload envelop containing the compressed speech data is then moved into the buffer area 367 for transmission over the RP T1 line 368.

STM 334 uplink voice processing requires the STM 334 to move voice data originated by the SU 20 to the switch. When a payload envelope has been received in the buffer area 367 and a DSP 364 allocated to the time slot is available, the CP 362 payload interrupt process 382 formats the received data into a DSP process payload command and sends the command to the Rx DSP 364. The DSP 364 then converts the ADPCM speech from the received payload into 16 bytes of PCM speech. The PCM speech is then moved from the FIFO 374 to the E1 buffer area 370 for transmission to the switch.

STM 334 downlink message processing involves moving layer 2 messages from the CAP 336 to the SU 20 via the RP 50. The CP 362 moves the layer 2 message from the VME buffer 386 to the Tx DSP 364 using the build layer 2 message command. The Tx DSP 364 responds to the build layer 2 message with a payload containing the layer 2 message. The payload containing the layer 2 message is then moved to the buffer area 367 for transmission over the T1 line 368.

STM 334 uplink message processing involves processing a message received from the SU 20. The payload envelope containing the message is passed to an available DSP 364. The DSP 364 responds to the CP 362 with the layer 2 message that is then inserted into the uplink circular queue 424 in the CP 362 where the message can be retrieved by the CAP 336 for further processing.

STM 334 anchor processing involves looping all received data from the E1 input buffer 370 to the E1 output buffer 370 for a designated time slot. Anchor processing is done by the CP 362 using the anchor interrupt process 384.

Figure 13:
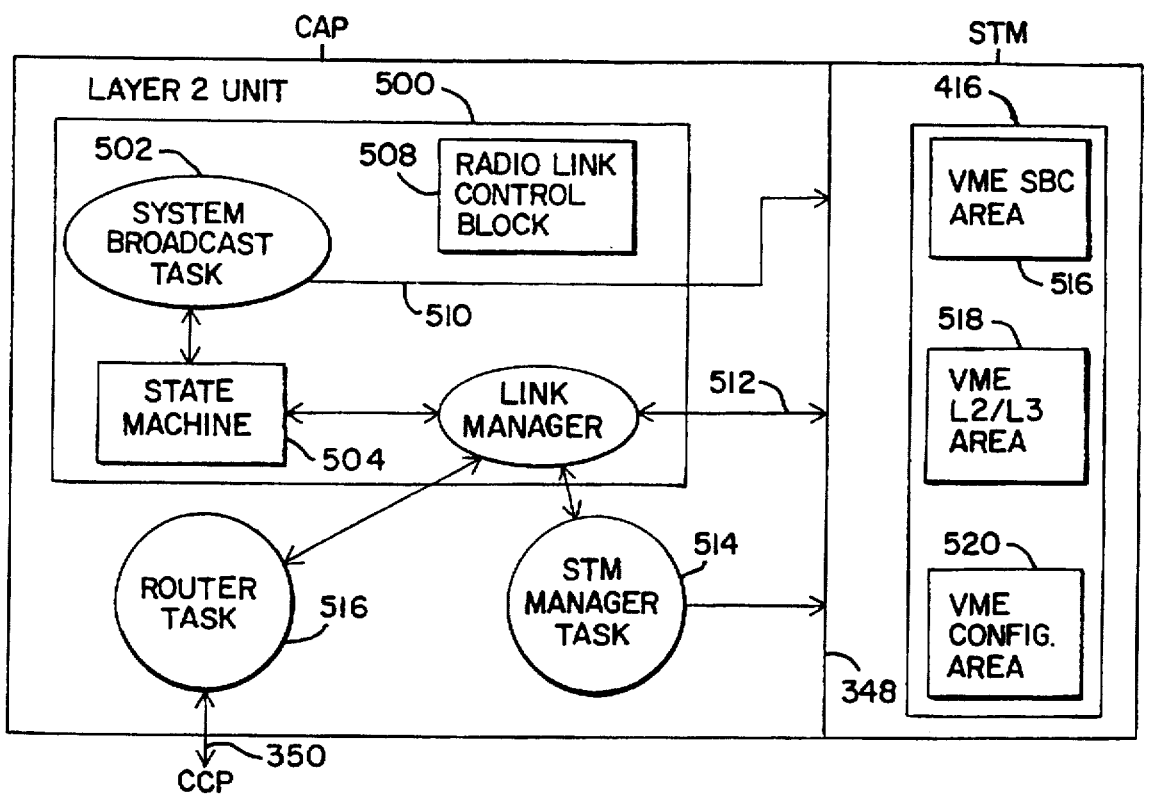
FIG. 13 is a functional block diagram of a CAP which may be used within an RPC.

As shown in FIG. 13, the CAP 336 preferably includes various processing and data elements. In a particularly preferred embodiment, the CAP 336 includes a wireless personal communication system layer 2 unit 500 which includes a system broadcast task 502, a wireless personal communication system link manager 506, a wireless personal communication system layer 2 state machine 504, and a radio link control block 508.

The system broadcast task 502 may have three message cues. An alert channel cue system, system information cues and priority request channel cue. The system broadcast task 502 preferably formulates a system broadcast channel (SBC) Superframe 510 from the three message cues which is sent to the STM 334. Within the STM, the SBC Superframe may be received in a VME SBC area 516 of the VME buffer 416. The system broadcast task 502 is preferably awakened every 1.02 seconds since the SBC Superframe 510 has a period of 1.024 seconds. The system broadcast task 502 may also communicate with the state machine 504.

The link manager 506 communicates with a router task 516 via messages from the CCP 338 over the internal LAN 350 and sends and receives layer 2 and 3 messages to the STM 334. The link manager 506 also sends link commands to an STM manager task 514 in communication with the STM 334. The VME buffer 416 has a layer 2 and layer 3 area 518 and a configuration area 520 for receiving and sending messages to the link manager 506 and the STM manager task 514. The link manager 506 also communicates with the state machine 504. The link manager 506 is responsible for establishing and maintaining radio links. The link manager 506 receives and processes CCP layer 3 messages and forwards any alert commands received from the CCP to the system broadcast task 502.

Messages sent to the STM 334 from the link manager 506 include header information such as the STM slot number, payload group number, time slot number (0/15), and message type (layer 2 or layer 3). The STM slot number, payload group number and time slot number constitute a radio link identifier RLID used to identify messages for active links. The radio link control block RLCB 508 contains an entry for each radio link. Each link is identified by the associated STM slot number, payload group number and time slot number. The RLCB 508 contains the following fields: RLID, assigned STM chassis number, assigned time slot number and current state.

The STM manager task 514 monitors and controls every STM 334 associated with the CAP 336. The STM manager 514 performs the functions of initializing the STM monitoring the STM 334 for alarms and failures, verifying software in each STM 334, reconstructing data structures from the STM 334 in the event of a failure, and providing utilities and writing commands over the VME bus 348.

The state machine 504 in the preferred embodiment has been implemented as a layer 2 state table that is shown in Table A below. Processing within the state machine 504 is preferably performed as directed by the state table. The state table includes various procedures described in detail below.

TABLE A

WACS/PACS Layer 2 State Table

| Events | Null State | Initial Access Pending | Link Up | Link Suspend | ALT In Progress | Anchored |
|---|---|---|---|---|---|---|
| Initial Access Req. | S00 | | | | | |
| Initial Access Cnf | | S01 | | | | |
| Initial Access Deny | | S02 | | | | |
| L3 Message | | | S01 | | | |
| Link Suspend | | | S03 | | | |
| Link Resume | | | | S08 | | |
| Access Release | | | S09 | S09 | | |
| ALT Request | S04 | | | | S04 | S04 |
| ALT Complete | | | | | S05 | |

TABLE A-continued

WACS/PACS Layer 2 State Table

| Events | States | | | | |
|---|---|---|---|---|---|
| | Null State | Initial Access Pending | Link Up | Link Suspend | ALT In Progress | Anchored |
| ALT Deny | | | | | SO1 | |
| ALT Exec | | | | | S10 | |
| ALT Ack | | | | | S10 | |
| Set Anchor | | | | | SO6 | |
| Release | | | | | | SO7 |
| Anchor | | | | | | |
| Set Link | | | SO1 | | | |
| Release Link | | | SO1 | | | |

WACS STATE PROCEDURES

State Procedure S00

This state procedure performs the following when an Initial Access Request is received in Null State.

1. Set the current state to Initial Access Pending.

State Procedure S01

1. Set the current state to Link Up.

State Procedure S02

This state procedure performs the following.

1. If anchor channel is allocated then activate voice channel on the anchor channel.
2. Deallocates all link resources.
3. Set the current state to the Null State.

State Procedure S03

This state procedure performs the following when a Link Suspend is received in the Link Up State.

1. Set the current state to Link Suspend State.
2. Forward LINK_SUSPEND to CCP.
3. Send Mute command to STM.

State Procedure S04

This state procedure performs the following when an ALT Request is received in Null State.

1. Set the state to the ALT In Progress.
2. Forward ALT_REQ to CCP.

State Procedure S05

This state procedure performs the following.

1. If (Intra-ALT) then switch the voice path to the new time slot or STM.
2. Stop TN202.
3. Set the current state to Link Up.
4. Forward ALT_COMP to CCP.

State Procedure S06

This state procedure performs the following.

1. Set the current state to Anchored.
2. Send command to Anchor STM to anchor a channel.

State Procedure S07

This state procedure performs the following.

1. Release all call resources.
2. Set current state to Null State.

State Procedure S08

This state procedure performs the following.

1. Set the current state to Link Up.
2. Forward LINK_RESUME to CCP.

State Procedure S09

This state procedure performs the following.

1. Set the current state to Null State.
2. Forward ACCESS_RELEASE to CCP.

State Procedure S10

This state procedure sets the current state to ALT In Progress.

Figure 14:
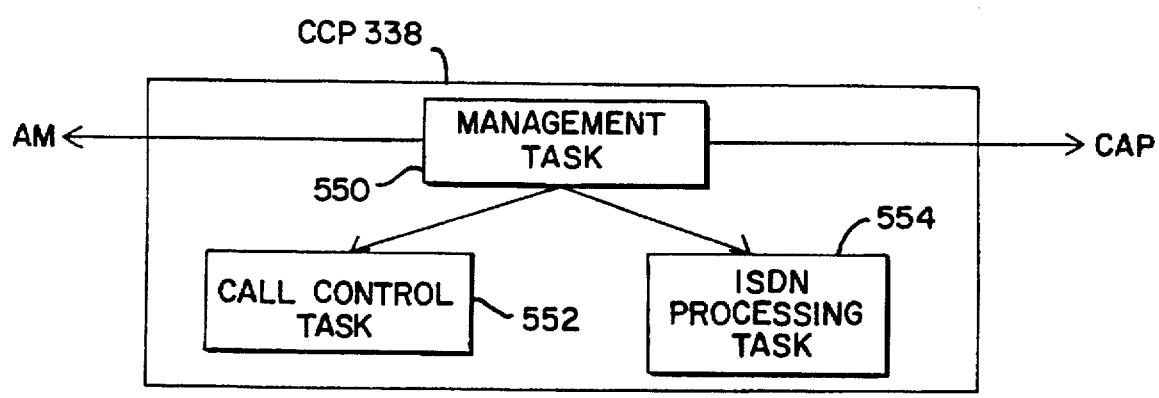
FIG. 14 is a functional block diagram of a CCP that may be used within an RPC.

As shown in FIG. 14, the CCP 338 includes process components that may be executed on a processor such as an INTEL 960 processor. The CCP 338 is loaded with multi-tasking operating system software such as VXWORKS from Wind River Systems. The process components include a management task 550 that initiates and directs messages between the other components, a call control task 552 that implements a layer 3 wireless personal communication system state machine, and an ISDN processing task 554. The ISDN processing task 554 implements layers 1, 2, and 3 of the ISDN access signaling protocol defined as CCITT standard Q931/Q921 and controls a synchronous protocol data formatter device that communicates with the switch 80 at the central office. The ISDN task 554 is performed by commercially available ISDN software such as the ISDN software available from DGM&S Inc. at 1025 Briggs Road, Suite 100, Mt. Laurel, N.J. 08054.

The management task 550 preferably spawns the other components and routes all incoming and outgoing messages from the AM 90 and the CAP 336. In a preferred embodiment, the call control task 552 has one thread for each active call. Each thread may be an instantiation of the wireless personal communication system layer 3 state machine defined in table form in Appendix A. The state machine table defined in Appendix A contains many terms defined in the Bellcore specification. Also, persons skilled in the art will recognize that the Intelligent Services Peripheral (ISP) supports the AM 90.

Figure 15:
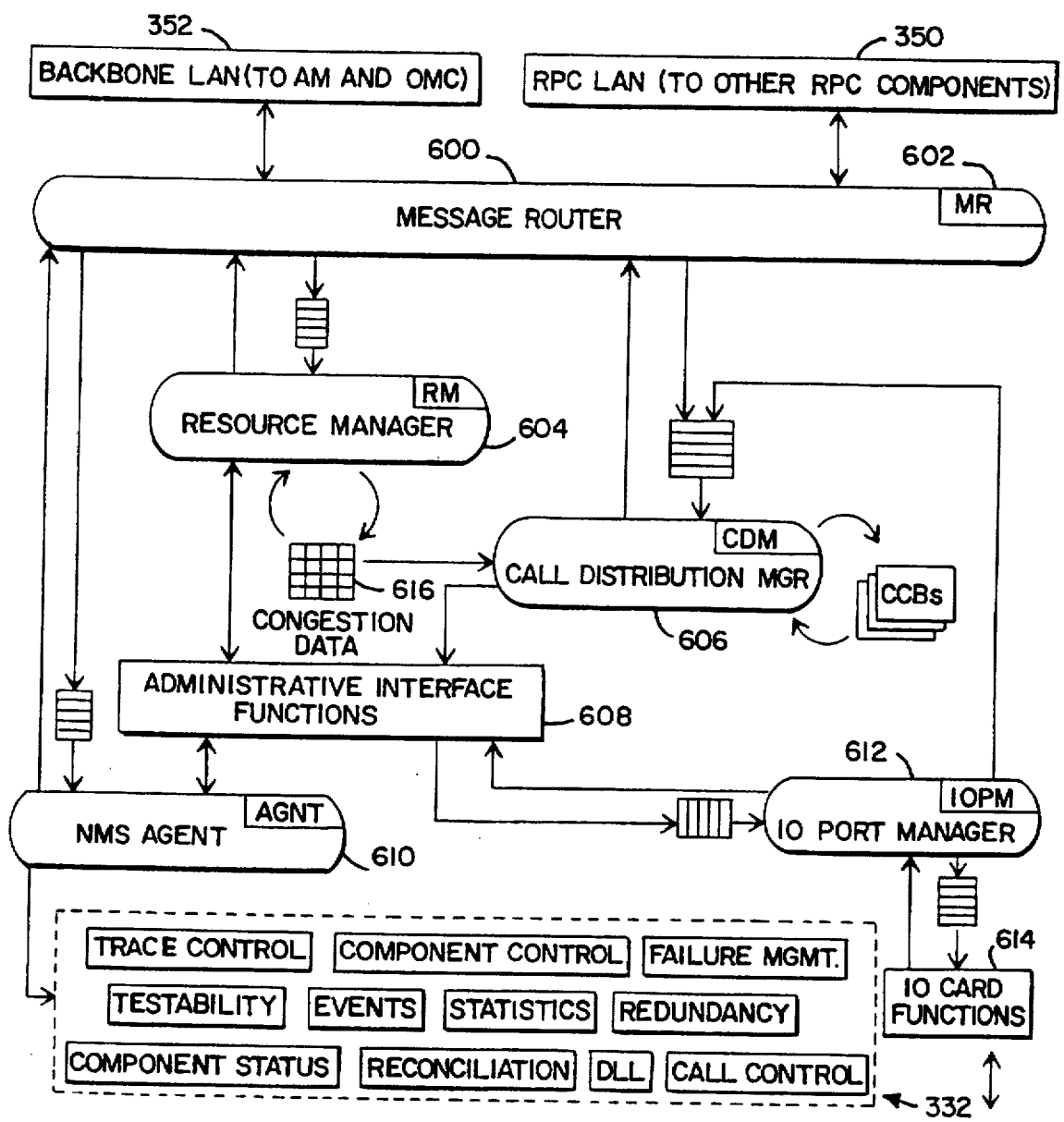
FIG. 15 is a functional block diagram of a global resource processor (GRP) that may be used within an RPC.

The call control task 552 may also have a thread that performs ALT DN management and a thread that routes messages to and from each of the state machine threads. The Global Resource Processor (GRP) 332 is a collection of tasks and functions that are executable preferably on a CPM board including an Intel 960 processor. As shown in FIG. 15, the GRP 332 includes a message router 600, a resource manager (RM) 604, a call distribution manager (CDM) 606, an administrative interface 608, a network management system (NMS) agent 610, and an Input/Output port manager (IOPM) 612. The message router 600 communicates with the AM 90 and the OMC 90 over the backbone LAN 352 and communicates with the other RPC components over the RPC LAN 350. The message router 600 is connected with the RM 604, the NMS agent 610, and the CDM 606. The CDM 606 is connected to the RM 604 through a congestion data block 616. The CDM 606 is also connected to the administrative interface 608 and the message router 600.

The IOPM 612 is connected to an IO card function module 614 that communicates with external communication links such as T1 lines. The IOPM 612 is connected to the CDM 606 and the administrative interface 608.

The RM task 604 is the central RPC 330 component responsible for handling resource shortages throughout the RPC 330. This task 604 manages buffers and queue shortages on RPC 330 components indicating a component's CPU is over-utilized with respect to the component's available memory. The RM 604 keeps track of global resources enabling the CDM 606 to balance the load among RPC processors. The RM 604 may throttle system activity within its control such that the offered traffic load is balanced against the available system resources. The RM 604 prevents the system from reaching a critical point in which increased activity results in a collapse of the components under the RM's 604 control.

The RM 604 manages congestion report messages received from components in the RPC 330 of the associated GRP 332. For each congestion report message, the RM 604 records appropriate statistics, and sends an acknowledgement to the sending component. The RM 604 manages a system resource table based on the congestion report messages. The RM 604 may receive commands for statistics reports from the NMS Agent (AGNT) 610.

The RM 604 recognizes the onset of system wide congestion in a way that protects against further congestion, reacts to congestion in a manner that is specific to the area of congestion and corresponds to the severity of the congestion level. The RM 604 allocates and tracks system resources available within the RPC so that traffic is prioritized in the order of emergency calls, existing traffic, and then new traffic with respect to the available resources.

The GRP 332 provides an interface to the OMC 70 for performing network management functions. The Network Management Agent 610 provides a transport mechanism to support these functions or may perform network management functions directly. The NMS Agent 610 performs the following functions: maintains statistics by application tasks in a global memory area, provides statistics to the OMC 70, monitors trace and control flags, maintains summary status information, processes alarms and call control requests, and supports processor downline loading and reconciliation.

Call control requests include call monitoring, call tracing, call path allocation, forced call handoff, and forced call clearing. The NMS agent 610 also handles call record management, component control in response to OMC commands, and debugging and testability support such as upline dump, and memory read/write.

The Call Distribution Manager (CDM) 606 provides call distribution and network management services. When a call setup is initiated, the CDM 606 determines the call identifier (RCID) and selects a CCP 338 for the call. The CDM 606 handles call manipulation requests (by controlling the appropriate CCP 338) from the OMC 70 such as call monitoring, forcing an ALT, clearing a call and fetching the status or statistics of a call.

The message router 600 allows the GRP 332 to perform call processing functions including distributing requests for call originations among active CCPs 338, providing via the Backbone LAN 352 an interface to other RPCs, initiating graceful disconnection of active calls when CCPs 338 fail, and polling active CCPs 338 for current call status information when switching in a backup GRP 332.

The IOPM 612 indicates when T1 line failures occur by frequently polling the IO Cards 614 minimizing the time between failure and resulting action. The IOPM 612 maintains and reports to the OMC 70 the status of I/O ports. The IOPM 612 also monitors T1 I/O Ports for alarm conditions and reports events to the OMC 70. Finally, the IOPM 612 may perform switchover for backup T1 cards in response to alarm conditions or to an operator request.

Another preferred embodiment allows the RPC 330 to perform functions traditionally handled in the AM 90. An RPC 330 performing traditionally AM functions may be implemented by adding a GRP 332 with an associated disk drive to the RPC 330. The disk drive includes various databases. These databases may provide for subscriber features, dynamic subscriber data, radio equipment configuration, altering area mapping, terminal location, routing instructions, call processing activity information, subscriber status, encryption information, or other subscriber desired information.

Traditionally AM functions provided in the RPC 330 on the added GRP 332 include authenticating and registering subscribers, administrating the radio network, managing billing information, and interacting with the database to determine the subscriber's radio location, status, alerting information, and terminating features. The GRP 332 may also control the two-stage alerting process by first locating the SU 20 and then directing the switch to establish a voice connection to the RP 50 and alert the subscriber. The GRP 332 works with the switch to provide originating service for wireless calls. The GRP 332 instructs the switch 80 to associate the call origination with the subscriber. The GRP 332 may query the database for the subscriber's originating features and control the switch to provide that set of features.

Although a single added GRP 332 and disk drive have been disclosed, the preferred embodiment is not limited to the number or arrangement of GRPs 332 or storage devices such as disk drives used for performing at least some traditionally AM functions. A network including multiple GRPs 332, storage devices, or other RPC 330 processing components may be arranged in various ways for efficiently implementing traditionally AM functions in the RPC 330 of the preferred embodiment.

Figure 16:
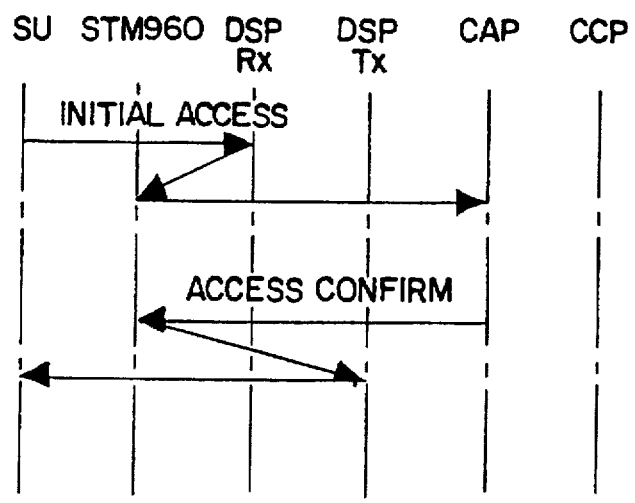
FIGS. 16–19 are message flow diagrams showing a preferred embodiment of various messages between an RPC and an SU.

FIG. 16 shows messages that may be transmitted between various RPC 330 elements and the SU 20 via the RP 50 for a layer 2 initial access message. The CP 362 (labeled STM960 in FIG. 16) receives a payload from the RP T1 line 368 communicating with the SU 20. The CP 362 distributes the payload to multiple Rx DSPs 364 to handle the individual time slots in the payload. Each Rx DSP 364 parses the time slot fast channel and determines that the payload is carrying an initial access message. The DSP 364 resets the acknowledge-mode-transfer link variables (NS/NR) and then forwards the initial access message through the CP 362 to the CAP 336 via the internal VME bus 348. The link manager 506 in the CAP 336 performs the necessary layer 2 protocol processing using the state machine 504 and sends an access confirm message via the CP 362 to the Tx DSP 364. The Tx DSP 364 formats the access confirm message in the fast channel of the time slot into a payload to be sent to the SU 20 over the RP T1 line 368.

Figure 17:
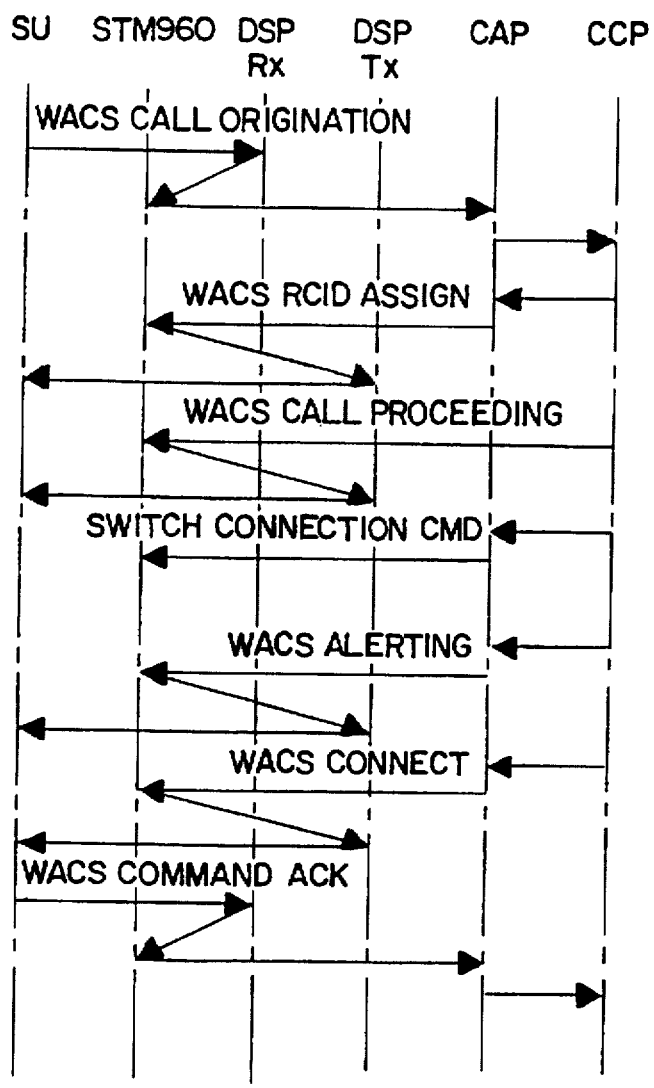

FIG. 17 shows an example of the message flow for a call originating from an SU 20. The Rx DSP 364 parses the fast channel and determines the call origination message is an acknowledge-mode-transfer (layer 3) message. The Rx DSP 364 performs acknowledge-mode-transfer processing including assembling the call origination message from the multiple segments received in the fast channel. The Rx DSP 364 also validates the checksum and sends an Info Ack Layer 2 message via shared RAM to the Tx DSP 364 for transmission over the RPT1 line 368 to the SU 20. When the complete layer 3 call origination message has been received, the Rx DSP 364 forwards the message to the CCP 338 via the CAP 336.

The CCP 338 performs layer 3 processing upon receiving the call origination message as defined in the layer 3 state machine (see Appendix A) and executed by the call control task 552. Layer 3 processing includes message exchange with the AM 90 and sending an RCID assign layer 3 message to the Tx DSP 364 via the CAP 336 and CP 362. The Tx DSP 364 fragments the layer 3 message into multiple segments if necessary and sends the RCID assign message to the SU 20. The Tx DSP 364 then performs ack-mode transfer processing such as waiting for any layer 2 info ack messages and retransmitting any unreceived message segments. The other messages shown in FIG. 17 are processed in a similar manner until the call is set up and a communication path is established through the RPC 330.

Figure 18:
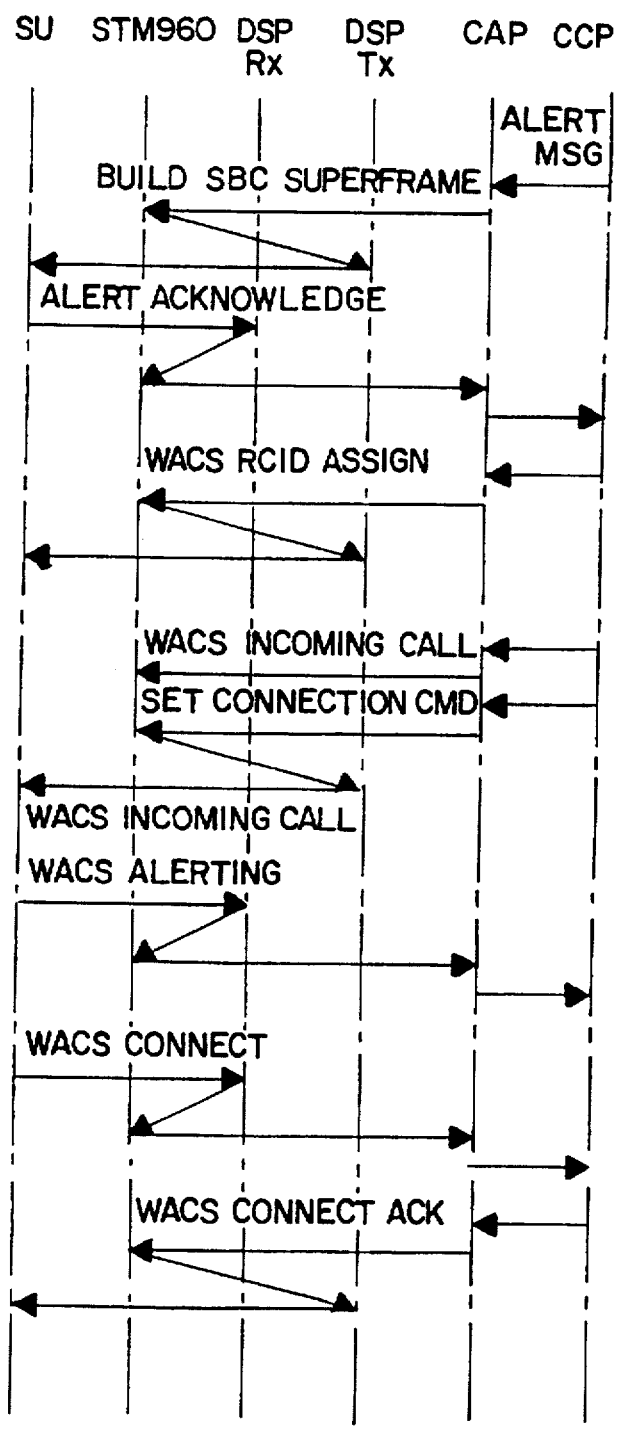

FIG. 18 shows an example of the RPC 330 message flow for a call delivery. First the CCP 338 receives an alert message from the AM 90 and sends an internal alert message to the CAP 336. The CAP 336 uses the system broadcast task 502 to format an SBC superframe 510 that is sent to each STM 334 managed by that CAP 336. The SBC superframe message is then transmitted by each STM 334 in the SBC slot of the payload on the RP T1 line 368. The remaining messages are layer 2 and layer 3 messages that proceed in a similar manner as described for call origination until a call connection is established.

Figure 19:
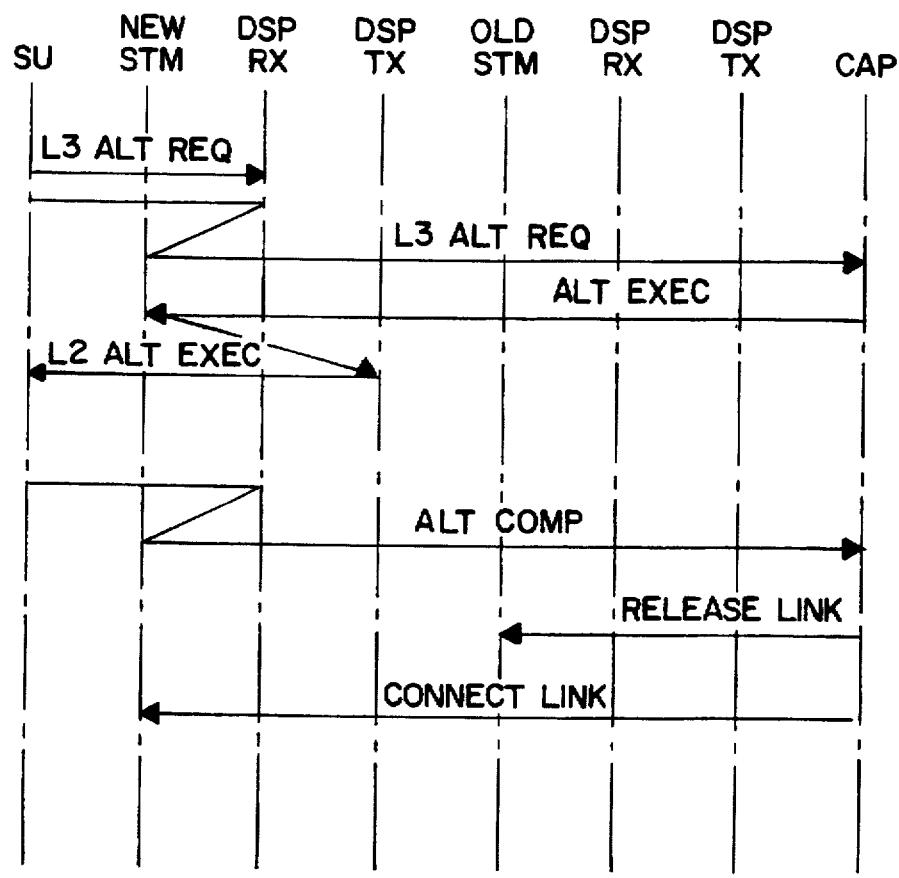

FIG. 19 shows an example of the RPC 330 message flow for an automatic link transfer. First, the DSP 364 receives a first and second portion of a layer three automatic link transfer (ALT) request message. The RPC 330 forwards the ALT_REQ message to the CAP 336. The CAP 336 sends an ALT_EXEC message to the DSP 364 which in turn sends the ALT_EXEC message to the SU 20. The SU 20 sends an ALT_COMP message to the DSP 364. The DSP 364 passes the ALT_COMP message on to the CAP 336. The CAP 336 sends a Release Link message to the old STM 334 and then sends a connect link message to the new STM 334 to complete the call handoff. By sending a layer three ALT request message, the RPC 330 provides more robust call handoff processing.

Additional advantages and modifications will readily occur to those skilled in the art. The invention, in its broader aspects, is therefore not limited to the specific details, representative apparatus, and illustrative examples shown and described. Various modifications and variation can be made to the present invention without varying from the scope or spirit of the invention, and it is intended that the present invention cover the modifications and variations provided they come within the scope of the appended claims and their equivalents.

Appendix A

Table of Layer 3 States in a Wireless Personal Communications System

| | State | <State Number> |
|---|---|---|
| Event | | <State Name> |
| Type of Event received by RPC | | <New State that the RPC should enter> |
| | | <RPC Action to be executed> |

| State / Event | 01 | 02 | 03 | 04 | 05 | 06 | 07 | 08 | 09 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| | NULL | REGISTERING | CALL REQUESTED | CALL STARTED | CALL PROCEEDING | CALL DIALING | CALL DELIVERED | CALL EXISTS | CALL ACTIVE | ALERT REQUESTED | DISC REQ SUB | DISC REQ NET | TEAR-ING DOWN CALL | DROP-PING RA-DIO CALL | DROP-PING IS DN LINK | LINK SUSP BND | INT-RA-ALT AT-TEMPT ED | INT-ER-ALT AN-CHOR | INT-ER-ALT TA-RGBET | AC-TI VE ALT CALL ANCHOR | AC-TI VE ALT CALL TARGET | DROP-PING LOOP-BACK |
| WACS_ TERM_REG _REQ | 02 01 | | | | | | | | | | | | | | | | | | | | | |
| WACS-CALL_REQ | 03 04 | | | | | | | | | | | | | | | | | | | | | |

-continued

| | | | | | | | | | | | | | | | | | | |
|---|---|---|---|---|---|---|---|---|---|---|---|---|---|---|---|---|---|---|
| WACS_CONNECT | | | | | 08 15 | | | | | | | | | | | | | |
| WACS_CONNECT_ACK | | | | | | 09 09 | | | | | | | | | | | | |
| WACS_ALERT_ACK | | | | | | | 07 11 | | | | | | | | | | | |
| WACS-ALERTING | | | | 06 14 | | | | | | | | | | | | | | |
| WACS_REL-COM | | 01 33 | 01 30 | 15 29 | 15 29 | | | | | | 15 — | 01 26 | | | | | | |
| WACS_DISCONNECT | | | | | | | 11 17 | | | | | | | | | 20 43 | | |
| LINK_SUSPEND | | | | | | | 16 — | | | | | | | | | | 19 — | |
| ALT_REQ | 19 52 | | | | | | | | | | 17 50 | | 18 — | | | 19 57 | 18 60 | |
| LINK_RESUME | | | | | | | | | | | | | | | | | | | |
| ALT_COMP | | | | | | | | | | | | | | 09 51 | 22 62 | 21 59 | | | |
| | | | | | | | | | | | | | | | | | | |
| TERM_REG ACK | | 02 02 | | | | | | | | | | | | | | | | |
| RCID_ASSIGN | | | 04 05 | | | 04 12 | | | | | | | | | | | | |
| P_ALERT | 10 10 | | | | | | | | | | | | | | | | | |
| P_RELEASE | | 02 33 | | | | 01 31 | | 01 31 | 13 18 | 13 19 | | | | | | 18 — | | |
| ISDN_SETUP | | | | 04 13 | | | 07 — | | | | | | | | | 18 55 | | |
| ISDN_ALERTING | | | | 06 07 | | | | | | | | | | | | | | |
| ISDN_CALL PROCEEDIN | | | | 05 06 | | | | | | | | | | | | 19 — | | |
| ISDN_PROGRESS | | | | 11 17 | | | | | | | | | | | | | | |
| ISDN_CONNECT | | | | | 08 08 | | | | | | | | | | | 19 56 | | |

-continued

| | | | | | | | | | | | | | | | | | | | |
|---|---|---|---|---|---|---|---|---|---|---|---|---|---|---|---|---|---|---|---|
| ISDN_CON-NECT_ACK | | | | | | | 09/16 | | | | | | | | | 20/57 | | | |
| ISDN_DISC | | | | 12/17 | | | 12/25 | | | | | | | | | | | | 15/64 |
| ISDN_RELEASE | | | | | | | | | | | 14/20 | | 01/26 | | | | | | | 09/63 |
| ISDN_REL_COMP | | | | | | | | | | | 14/— | | 01/26 | | | | | | | |
| TC3031 EXPIRY | | 02/34 | | | | | | | | | | | | | | | | | |
| TR217 EXPIRY | | | | | | | 15/65 | | | | | | | | 15/65 | | 22/— | | |
| CALL_RELEASE | | | | | | | | | | | | | | | | | | | |
| CALL_RELEASE_REQUEST | | | | | | | | | | | | | | | | | | | |
| CALL_RELEASE_COMP | | | | | | | | | | | | | | | | | | | |
| TC3111 expiry | | | | | | | | | | | | 15/21 | 15/21 | | | | | | |

4.2 RPC ACTIONS

1. Send TERM_REG_REQ to ISP. Start TC3031
2. Stop TC3031. Start TC3191. Send WACS_TERM_REG_ACK to the SU
3. Stop TC3191. Release call resources.
4. Send CALL_REQUEST to ISP
5. Send RCID_ASSIGN to SU. Send ISDN_SETUP to CO. Start T-ANS. Record Time Stamp #1
6. Send WACS_CALL_PROC to SU.
7. Sends no messages.
8. Stop T-ANS. Record Time Stamp #2. Send WACS_COnnect to SU.
9. Send ISDN_CONNECT_ACK to CO. Send P_CONNECT to ISP.
10. Send WACS_ALERT to SU NR201 times. Store RCID_ID and Int_DN.
11. Send ALERT_ACK to ISP. Start TC3011.
12. Stop TC3011. Start TC3021. Send RCID_ASSIGN to SU.
13. Stop TC3021. Record Time Stap #1. Send WACS_INCOMING_CALL to SU.
14. Send ISDN_Alerting.
15. Send ISDN_CONNECT to C.O. Record Time Stamp #2.
16. Send P_CONNECT to ISP.
17. Send P_DISCONNECT to ISP. Start TC3192.
18. Stop TC3192. Send ISDN_DISC to the CO. Record Time Stamp #3. Send WACS_RELEASE to SU.
19. Stop TC3192. Send ISDN_RELEASE to the CO. Send WACS_DISCONNECT to SU. Start TC3111.
20. Send ISDN_REL_COMP to C.O.
21. Send WACS_RELEASE to SU.
22–24. No Action listed.
25. Send P_DISCONNECT to ISP. Start TC3182. Record Time Stamp #3.
26. Send FURTHER_CALL_INFO an P_REL_COM to ISP.
27, 28. No Action listed.
29. Stop TC3192. Send ISDN_DISC to the CO. Record Time Stamp #3.
30. No Action listed.
31. Send ISDN_REL_COMP to CO. Send P_REL_COM to ISP.
32. Send WACS_RELEASE to SU. Stop TC3031. Start TC3191.
33. Stop TC3191.
34. Send WACS_RELEASE TO SU. Start TC3191.
35–49. No Action listed.
50. Send ALT_EXEC to SU. Start TN202.
51. Send ALT_COMP to ISP Release old radio link.
52. Send ALT_ACK to SU. Send ISDN_SETUP for anchor RPC's ALT_DN TO CO. Start T-ANS.
53, 54. No Action listed.
55. Bridge the original call to the loop-back call. Send ISDN_CONNECT TO SU.
56. Stop T-ANS. Send ALT_EXEC to SU. Send ISDN_CON_ACK to CO. Start TN202.
57. Send ALT_EXEC to SU.
58. No Action listed.
59. Send ALT_COMP to ISP.
60. Send ALT_EXEC to SU. Disconnect "bridge".
61. Send ALT_COMP to ISP.
62. Send ALT_COMP to ISP. Send ISDN_DISC to CO for loopback call.
63. Send ISDN_REL_COMP to CO for loopback call.

64. Send ISDN_REL to CO for loopback call.
65. Send ISDN_DISC to CO. Time Stamp #3.

What is claimed is:

1. A radio port controller in a wireless personal communications system comprising:
   a first interface module in communication with a radio port;
   a second interface module in communication with a digital switch wherein said second interface module comprises a plurality of interface cards, each card having a first set of pins for producing a T1 signal and a second set of pins for producing an E1 signal;
   at least one switching transcoder module (STM) in communication with said first and second interface modules; and
   a communication backplane comprising:
      a T1 databus in communication with said STM and said first interface module;
      an E1 databus in communication with said STM and said second interface module;
      a plurality of slots adapted to receive said interface card; and
      a control switch for selectively connecting one of said sets of pins to said E1 databus.

2. The radio port controller of claim 1 wherein said STM comprises:
   a first communications buffer coupled to said first interface module for communicating with said radio port;
   a second communications buffer coupled to said second interface module for communicating with said digital switch;
   a plurality of digital signal processors (DSPs) in communication with said first communications buffer and said second communications buffer, at least one of said DSPs having an interrupt less than 1 millisecond; and
   a central processor in communication with said DSPs for controlling transmission of data between said DSPs and said communications buffers.

3. The radio port controller of claim 1 wherein said first interface module includes at least one T1 card.

4. The radio port controller of claim 3 wherein each T1 card is coupled to at least one T1 line, and each STM processes messages from at least one of said T1 cards.

5. The radio port controller of claim 1 wherein said STM includes a first DSP for processing incoming messages and a second DSP in communication with said first DSP for processing outgoing messages.

6. The radio port controller of claim 1 wherein said STM comprises:
   a plurality of DSPs capable of processing both digitized voice and personal communication system messages; and
   a plurality of memory buffers in communication with said DSPs, wherein said buffers are circular buffers adapted to receive and transmit data messages between said first and second interface modules.

7. The radio port controller of claim 6, wherein at least one of said personal communication system messages comprises a layer three automatic link transfer request message.

8. The radio port controller of claim 6 wherein each STM further includes a central processor for allocating each time slot in each T1 line to at least one of the DSPs.

9. The radio port controller of claim 8 wherein the central processor communicates with each DSP using interprocessor data messages.

10. The radio port controller of claim 1 further including at least one call control processor (CCP) in communication with said STM.

11. The radio port controller of claim 10 wherein said CCP includes an ISDN state machine for processing ISDN messages and a WACS layer 3 protocol state machine for processing WAGS layer 3 messages.

12. The radio port controller of claim 10 wherein said CCP includes a multi-tasking operating system adapted to create a thread supporting a call processing routine for each active call.

13. The radio port controller of claim 10 further including at least one channel access processor (CAP) in communication with each of said STMs and each of said CCPs, said CAP for processing layer 2 personal communication system messages.

14. The radio port controller of claim 13 wherein said CAP includes a communication interface and a common processor module.

15. The radio port controller of claim 13 further including a global resource processor in communication with at least one of said CCPs and at least one of said CAPs for balancing loading among said CCPs and said CAPs.

16. A radio port controller in a wireless personal communications system comprising:
   a first interface module in communication with a radio port;
   a second interface module in communication with a digital switch; and
   a communication backplane in communication with said first and second interfaces, said backplane including a T1 databus, an E1 databus, a plurality of slots switchably connected to said T1 and E1 databuses, and a control switch for selectively connecting each of said slots to one of said databuses.

17. A radio port controller in a wireless personal communications system comprising:
   a first interface module in communication with a radio port;
   a second interface module in communication with a digital switch;
   at least one switching transcoder module (STM) in communication with said first and second interface modules;
   at least one call control processor (CCP) in communication with said STM; and
   at least one channel access processor (CAP) in communication with each of said STMs and each of said CCPs, said CAP for processing layer 2 personal communication system messages.

18. The radio port controller of claim 17 wherein said CAP includes a communication interface and a common processor module.

19. The radio port controller of claim 17 further including a global resource processor in communication with at least one of said CCPs and at least one of said CAPs for balancing loading among said CCPs and said CAPs.

* * * * *